United States Patent
Conti et al.

(10) Patent No.: US 11,473,645 B2
(45) Date of Patent: Oct. 18, 2022

(54) HYDRAULIC SHOCK-ABSORBER WITH HYDRAULIC STOP MEMBER AND ADJUSTMENT DEVICE

(71) Applicant: MARELLI SUSPENSION SYSTEMS ITALY S.P.A., Corbetta (IT)

(72) Inventors: Piero Antonio Conti, Asti (IT); Fabio Cotto, Turin (IT); Marco Di Vittorio, Turin (IT); Giordano Greco, Turin (IT); Benjamin Talon, Cahors (FR)

(73) Assignee: MARELLI SUSPENSION SYSTEMS ITALY S.P.A., Corbetta (IT)

( * ) Notice: Subject to any disclaimer, the term of this patent is extended or adjusted under 35 U.S.C. 154(b) by 0 days.

(21) Appl. No.: 17/299,440

(22) PCT Filed: Dec. 3, 2019

(86) PCT No.: PCT/IB2019/060379
§ 371 (c)(1),
(2) Date: Jun. 3, 2021

(87) PCT Pub. No.: WO2020/115642
PCT Pub. Date: Jun. 11, 2020

(65) Prior Publication Data
US 2022/0082149 A1 Mar. 17, 2022

(30) Foreign Application Priority Data
Dec. 3, 2018 (IT) .................. 102018000010763

(51) Int. Cl.
*F16F 9/49* (2006.01)
*F16F 9/504* (2006.01)
*F16F 9/512* (2006.01)

(52) U.S. Cl.
CPC ............. *F16F 9/49* (2013.01); *F16F 9/504* (2013.01); *F16F 9/5126* (2013.01)

(58) Field of Classification Search
CPC ............. F16F 9/49; F16F 9/504; F16F 9/5126
See application file for complete search history.

(56) References Cited

U.S. PATENT DOCUMENTS

| | | | | |
|---|---|---|---|---|
| 4,045,008 A | * | 8/1977 | Bauer | F16F 9/49 267/64.11 |
| 4,250,793 A | * | 2/1981 | Berg | F15B 15/227 92/85 B |

(Continued)

FOREIGN PATENT DOCUMENTS

| | | | | |
|---|---|---|---|---|
| DE | 102006055192 B3 | * | 4/2008 | ............ F16F 9/0218 |
| EP | 3406931 A1 | | 11/2018 | |

(Continued)

OTHER PUBLICATIONS

International Search Report and Written Opinion of the International Searching Authority for PCT International Application No. PCT/IB2019/060379 dated Apr. 8, 2020.

*Primary Examiner* — Xuan Lan Nguyen
(74) *Attorney, Agent, or Firm* — Howard & Howard Attorneys PLLC (57) ABSTRACT

A shock-absorber has an outer cylindrical tube, an inner cylindrical tube, a rod, a main piston and a hydraulic stop member received in a compression chamber and operating during an end section of the compression stroke of the shock-absorber to cause an increase in the hydraulic damping force. The hydraulic stop member has a cup-shaped body mounted in the compression chamber and a first auxiliary piston which is mounted on a cylindrical body rigidly connected to the main piston and is configured to sealingly slide in the cup-shaped body during an end section of the compression stroke, encompassing a working chamber with the cup-shaped body. A sliding member is slidably received inside the cylindrical body for opening or closing at least one first passage of the cylindrical body through which oil flows (Continued)

from the working chamber of the cup-shaped body to the compression chamber of the shock-absorber.

8 Claims, 5 Drawing Sheets

(56) References Cited

U.S. PATENT DOCUMENTS

| | | | | |
|---|---|---|---|---|
| 4,323,224 | A * | 4/1982 | Freitag | F16F 9/49 267/64.15 |
| 9,605,726 | B2 | 3/2017 | Baldoni et al. | |
| 10,208,830 | B2 * | 2/2019 | Bruno | F16F 9/185 |
| 2018/0119770 | A1 | 5/2018 | Bruno et al. | |
| 2018/0355944 | A1 * | 12/2018 | Veltum | F16F 9/185 |

FOREIGN PATENT DOCUMENTS

| | | | |
|---|---|---|---|
| FR | 3049502 | A1 | 10/2017 |
| FR | 3050496 | A1 | 10/2017 |
| WO | 2016146660 | A1 | 9/2016 |
| WO | 2017174887 | A1 | 10/2017 |
| WO | 2019167006 | A1 | 9/2019 |

* cited by examiner

HYDRAULIC SHOCK-ABSORBER WITH HYDRAULIC STOP MEMBER AND ADJUSTMENT DEVICE

CROSS-REFERENCE TO RELATED APPLICATIONS

The present application is a National Stage of International Patent Application No. PCT/IB2019/060379, filed Dec. 3, 2019, which claims priority to and all the benefits of Italian Patent Application No. 102018000010763, filed on Dec. 3, 2018 both of which are hereby expressly incorporated herein by reference in its entirety.

BACKGROUND OF THE INVENTION

1. Field of Invention

The present invention generally relates to a hydraulic shock-absorber, and in particular, to a twin-tube hydraulic shock-absorber provided with a hydraulic stop member configured to operate during the compression stroke of the shock-absorber in order to produce an increase in the hydraulic damping force as the shock-absorber approaches its end-of-stroke position in compression.

Even if the present invention will be described and illustrated hereinafter with reference to its application on a vehicle suspension, it is to be understood that the hydraulic shock-absorber of the present invention is not limited to this specific application, but may be used in other technological fields.

2. Description of Related Art

As is known, a twin-tube hydraulic shock-absorber comprises an outer cylindrical tube, an inner cylindrical tube coaxial to the outer cylindrical tube and defining therewith an annular chamber filled in an upper portion thereof with a compressible fluid (gas), a rod arranged coaxially to the inner and outer cylindrical tubes and partially protruding from the upper end thereof, and a piston slidably mounted in the inner cylindrical tube and fixed to the lower end of the rod. The piston separates the inner volume of the inner cylindrical tube into a rebound chamber and a compression chamber, which contain an incompressible damping fluid (oil). The piston is provided with a first pair of one-way valves, namely a compensation valve, which controls the flow of the damping fluid from the compression chamber to the rebound chamber during the compression stroke of the shock-absorber, and a rebound valve, which controls the flow of the damping fluid from the rebound chamber to the compression chamber during the rebound stroke of the shock-absorber. A valve assembly is provided on the bottom of the shock-absorber and comprises a second pair of one-way valves, namely a compression valve, which controls the flow of the damping fluid from the compression chamber to the annular chamber during the compression stroke, and an intake valve which controls the flow of the damping fluid from the annular chamber to the compression chamber during the rebound stroke.

A hydraulic shock-absorber as specified above is known from International Patent Application WO 2016/146660 A1 in the name of the instant Applicant.

According to the above-mentioned prior art solution, the shock-absorber is provided with a hydraulic stop member operating during the compression stroke of the shock-absorber, the hydraulic stop member comprising a cup-shaped body mounted in the compression chamber of the shock-absorber, coaxially thereto, and an auxiliary piston mounted at the lower end of a cylindrical body which is fixed to the rod of the shock-absorber, coaxially thereto, and extends on the opposite side of the rod with respect to the piston of the shock-absorber, i.e. towards the bottom of the shock-absorber. The auxiliary piston is configured to sealingly slide inside the cup-shaped body during the final section of the compression stroke of the shock-absorber, i.e. when the piston of the shock-absorber approaches the end-of-stroke position during the compression stroke. The cup-shaped body comprises a side wall, separate from the inner cylindrical tube of the shock-absorber, and a bottom wall. The side wall and the bottom wall of the cup-shaped body define, together with the auxiliary piston, a working chamber where the damping fluid is compressed by the auxiliary piston when the latter slides in the working chamber towards the bottom wall of the cup-shaped body. Axial channels are provided on the inner surface of the side wall of the cup-shaped body to allow the damping fluid to flow axially out of the working chamber when the auxiliary piston slides in the working chamber towards the bottom wall of the cup-shaped body. The axial channels have a cross-section with an area that decreases continuously along this axis towards the bottom wall of the cup-shaped body, so that the damping effect produced by the hydraulic stop member on the rod of the shock-absorber during the compression stroke of the shock-absorber increases continuously as the auxiliary piston slides in the working chamber towards the bottom wall of the cup-shaped body.

In this known shock-absorber, the area of the hydraulic passages of the hydraulic stop member, and therefore the damping characteristic curve of the hydraulic stop member, cannot vary in any way as the static load conditions of the vehicle vary. This may be a disadvantage when, for example, the shock-absorber is used in a rear suspension of a vehicle, where the static load on the suspension changes significantly when switching from the no-load to the full-load condition of the vehicle.

SUMMARY OF THE INVENTION

It is an object of the present invention to provide a hydraulic shock-absorber of the type specified above, which allows the damping characteristic curve of the hydraulic stop member to be adjusted depending on the static load acting on the suspension.

This and other objects are fully achieved by a hydraulic shock-absorber as described and claimed herein.

Advantageous embodiments are also described.

In short, the present invention provides a hydraulic shock-absorber of the type specified above, wherein the cylindrical body on which the auxiliary piston is mounted is a hollow body and has, above the auxiliary piston, at least one passage extending through the side wall of the cylindrical body to put the working chamber of the hydraulic stop member in fluid communication with the compression chamber of the shock-absorber. The shock-absorber comprises a sliding member slidably received inside the cylindrical body for sliding along the axis of the cylindrical body to open or close the at least one passage of the cylindrical body, as well as elastic means and damping means configured to cooperate with the sliding member in order to move the sliding member depending on the static load acting on the vehicle suspension and on the average position of the piston of the shock-absorber, as well as of the cylindrical body therewith, between a first position (low load) where the sliding member leaves the at least one passage open, thereby allowing a flow of oil from the working chamber of the hydraulic stop member to the compression chamber of the shock-absorber, and a second position (high load) where the sliding member closes the at least one passage.

Due to the fact that the sliding member leaves open or closes the passage (or passages) of the cylindrical body depending on the average position of the piston of the shock-absorber and on the static load acting on the suspension, the hydraulic stop member will have a different damping characteristic curve depending on the static load acting on the suspension.

BRIEF DESCRIPTION OF THE DRAWINGS

Further features and advantages of the present invention will become more apparent from the following detailed description, provided purely by way of non-limiting example with reference to the accompanying drawings, wherein.

DETAILED DESCRIPTION

Figure 1:
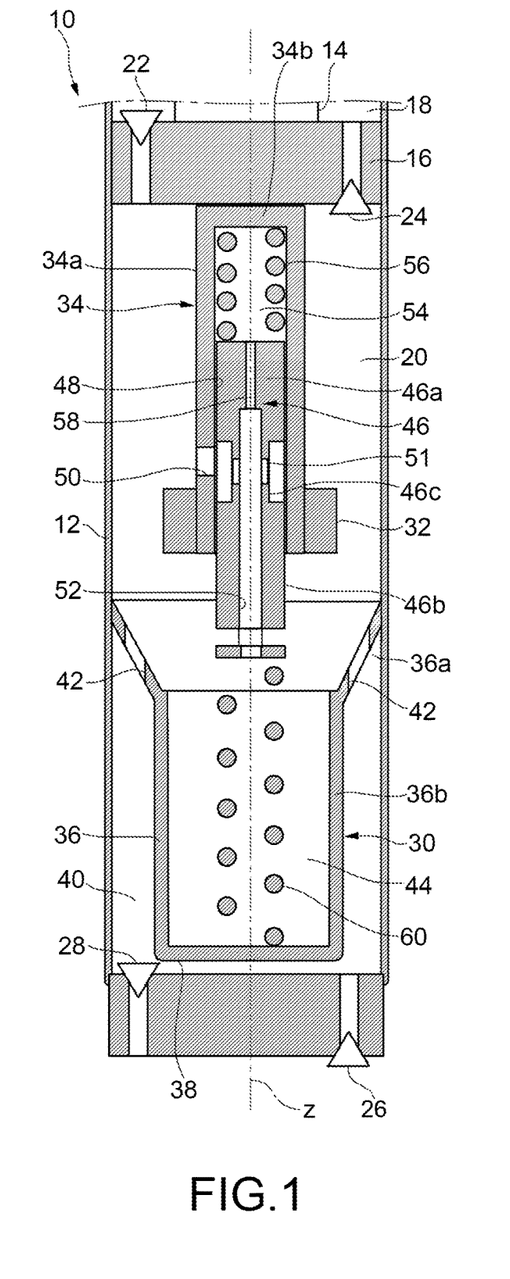
FIG. 1 is a schematic sectional view of a portion of a twin-tube hydraulic shock-absorber for a vehicle according to a first embodiment of the present invention, in a condition of low static load acting on the suspension (unladen vehicle)
Figure 2:
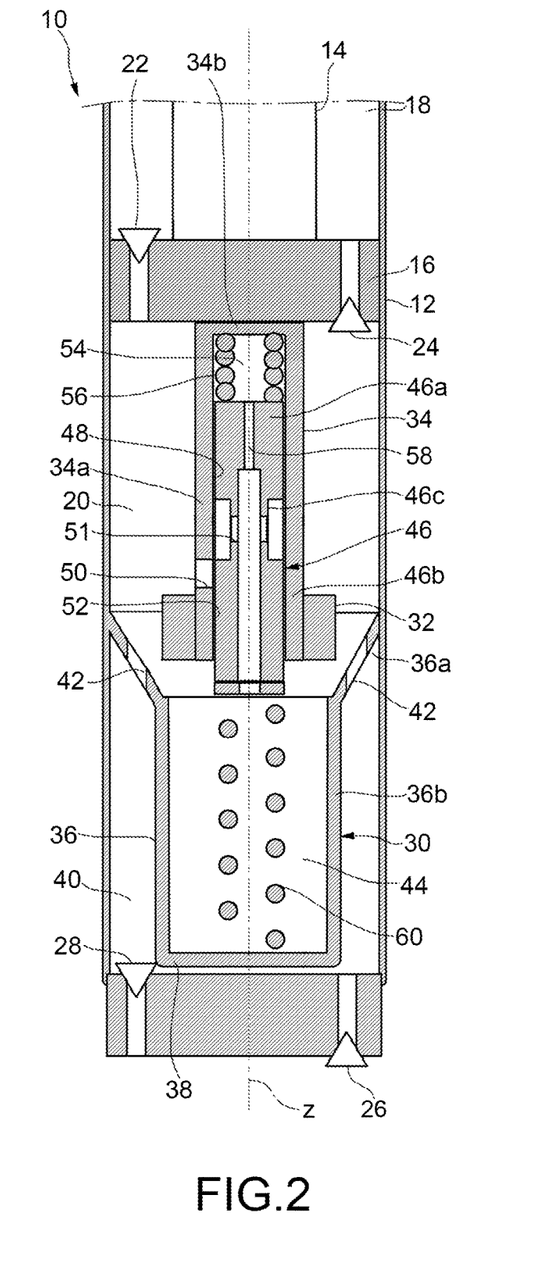
FIG. 2 is a schematic sectional view of a portion of a twin-tube hydraulic shock-absorber for a vehicle according to a first embodiment of the present invention, in a condition of high static load acting on the suspension (fully loaded vehicle)

With reference first to FIGS. 1 and 2, a twin-tube hydraulic shock-absorber for a vehicle suspension is generally indicated at 10 and comprises, in a per-se-known manner, an outer cylindrical tube (not shown), an inner cylindrical tube 12 coaxially arranged to the outer cylindrical tube and defining with the outer cylindrical tube an annular chamber (not shown) filled with compressible fluid (gas) in an upper portion thereof, a rod 14 coaxially arranged to the inner cylindrical tube 12 (and therefore also to the outer cylindrical tube) and partially protruding from the upper end thereof, and a piston 16 (hereinafter referred to as main piston) slidably mounted in the inner cylindrical tube 12 and fixed to the lower end of the rod 14. The terms "upper" and "lower" refer herein to the arrangement of the shock-absorber shown in the drawings, wherein the rod protrudes upwards from the inner and outer cylindrical tubes, but the shock-absorber may also be arranged with the rod protruding downwards from the inner and outer cylindrical tubes.

The longitudinal axis of the shock-absorber 10 is indicated at z.

The main piston 16 separates the inner volume of the inner cylindrical tube 12 into an upper chamber 18, or rebound chamber, and a lower chamber 20, or compression chamber, which contain an incompressible damping fluid. Oil is typically used as the damping fluid; therefore, for simplicity, the word "oil" will be used hereinafter to identify the damping fluid However, the present invention is not limited to use of oil as damping fluid, as any other incompressible fluid may be used.

The main piston 16 is provided, in a per-se-known manner, with a first valve assembly comprising a pair of one-way valves 22 and 24, namely a so-called compensation valve 22, which controls the oil flow from the compression chamber 20 to the rebound chamber 18 during the compression stroke of the shock-absorber, and a so-called rebound valve 24, which controls the oil flow from the rebound chamber 18 to the compression chamber 20 during the rebound stroke of the shock-absorber.

A second valve assembly is provided, in a per-se-known manner, on the bottom of the shock-absorber 10, namely on the bottom of the inner cylindrical tube 12, and comprises a pair of one-way valves 26 and 28, namely a so-called compression valve 26, which controls the oil flow from the compression chamber 20 to the annular chamber during the compression stroke, and a so-called intake valve 28, which control the oil flow from the annular chamber to the compression chamber 20 during the rebound stroke.

The shock-absorber 10 further comprises a hydraulic stop member configured to operate during the compression stroke of the shock-absorber, more precisely during a final section of the compression stroke of the shock-absorber, to increase the hydraulic braking force near the end-of-stroke position in compression.

The hydraulic stop member comprises a cup-shaped body 30 mounted inside the compression chamber 20 and a piston 32 (hereinafter referred to as auxiliary piston) configured to axially slide in the cup-shaped body 30 in the final section of the compression stroke of the shock-absorber.

The auxiliary piston 32 is connected to the rod 14 of the shock-absorber so as to move integrally therewith along the longitudinal axis z. More specifically, the auxiliary piston 32 is mounted at the lower end of the cylindrical body 34 which is connected to the rod 14 and extends coaxially to the rod 14 on the opposite side of the rod with respect to the main piston 16, i.e. towards the bottom of the inner cylindrical tube 12.

The cup-shaped body 30 is open at the top, i.e. towards the rod 14 and the main piston 16, and comprises a side wall 36 extending coaxially to the inner cylindrical tube 12 and a bottom wall 38. The cup-shaped body 30 is made as a separate piece from the inner cylindrical tube 12 and is rigidly connected thereto, for example, by force fitting.

According to the illustrated embodiment, the side wall 36 of the cup-shaped body 30 comprises an upper wall portion 36a, facing the side opposite to the bottom wall 38, and a lower wall portion 36b, facing the bottom wall 38.

The lower wall portion 36b has a substantially cylindrical shape with an outer diameter smaller than the inner diameter of the inner cylindrical tube 12. Between the lower wall portion 36b of the cup-shaped body 30 and the inner cylindrical tube 12 there is an annular passage 40, which is in fluid communication with the portion of the compression chamber 20 below the bottom wall 38 of the cup-shaped body 30.

The upper wall portion 36a has a flared shape with a maximum outer diameter substantially equal to the inner diameter of the inner cylindrical tube 12. Moreover, the upper wall portion 36a has a plurality of openings 42 configured to put the portion of the compression chamber 20 above the cup-shaped body 30 in communication with the portion of the compression chamber 20 below the cup-shaped body 30, and thus with the valve assembly placed at the bottom of the inner cylindrical tube 12 (one-way valves 26 and 28), through the annular passage 40.

On the inner surface of the side wall 36 of the cup-shaped body 30, in particular on the inner surface of the lower wall portion 36b, there are provided, as is known, for example, from the aforementioned patent application WO 2016/146660, a plurality of axial channels (not shown). The axial channels are configured to allow oil to flow out of the chamber (hereinafter referred to as working chamber 44) enclosed by the lower wall portion 36b and comprised between the auxiliary piston 32 and the bottom wall 38, when the auxiliary piston 32 moves inside the cup-shaped body 30 towards the bottom wall 38 thereof. The axial channels preferably have a cross-section with an area that decreases continuously towards the bottom wall 38. More specifically, the axial channels preferably have a width (i.e. a size in the circumferential direction) that decreases continuously, e.g. linearly, towards the bottom wall 38. The depth (i.e. the size in radial direction) of the axial channels may also decrease continuously, e.g. linearly, towards the bottom wall 38. The flow cross-sectional area through which oil may flow out of the working chamber 44 therefore decreases continuously as the auxiliary piston 32 moves inside the cup-shaped body 30 towards the bottom wall 38. The decrease in the flow cross-sectional area results in a progressive increase in the damping force generated on the auxiliary piston 32, and therefore on the rod 14 to which the auxiliary piston 32 is attached.

The axial channels may be replaced by calibrated holes or combined with calibrated holes suitably sized to obtain a given law of variation of the damping force as a function of the stroke of the auxiliary piston 32 in the cup-shaped body 30.

Moreover, on the bottom wall 38 of the cup-shaped body 30 a one-way valve may be provided to allow oil to flow from the working chamber 44 to the portion of the compression chamber 20 arranged below the cup-shaped body 30, as described in International patent application WO2019/167006 in the name of the instant Applicant.

According to the present invention, the shock-absorber 10 further comprises an adjustment device, which is a completely passive device associated with the hydraulic stop member to adjust the behavior of the hydraulic stop member as a function of the static load acting on the vehicle suspension, i.e. as a function of the vehicle load when the shock-absorber is used in a vehicle suspension.

The adjustment device comprises a sliding member 46 configured to axially slide inside a cavity 48 of the cylindrical body 34 so as to open or close, depending on the axial position thereof with respect to the cylindrical body 34 and to the rod 14, one or more first passages or orifices 50 (only one of which is shown in FIGS. 1 and 2) which extend through the side wall (indicated at 34a) of the cylindrical body 34 and are arranged above the auxiliary piston 32.

In the illustrated embodiment, the sliding member 46 comprises an upper cylindrical portion 46a and a lower cylindrical portion 46b, both sealingly slidable along the inner cylindrical surface of the cavity 48 of the cylindrical body 34, and an intermediate cylindrical portion 46c having a smaller diameter than the upper and lower cylindrical portions 46a and 46b and having a plurality of radial passages 51. The sliding member 46 further comprises an axial channel 52 that extends coaxially to the sliding member 46 through the lower cylindrical portion 46b and the intermediate cylindrical portion 46c, leading to the lower end of the sliding member 46, and puts the working chamber 44 of the cup-shaped body 30 in fluid communication with the compression chamber 20 of the shock-absorber 10 when the sliding member 46 is positioned along the cavity 48 with the intermediate cylindrical portion 46c thereof facing the first passage (or passages) 50.

The sliding member 46 defines with the side wall 34a and an upper wall 34b of the cylindrical body 34 an upper pressure chamber 54, which accommodates a return spring 56. The upper pressure chamber 54 is in fluid communication with the axial channel 52 of the sliding member 46, and thus with the working chamber 44 of the cup-shaped body 30, through a calibrated orifice 58 that extends axially through the upper cylindrical portion 46a and is sized so as to cause a high level of damping for oil flowing between the working chamber 44 and the upper pressure chamber 54.

The adjustment device further comprises a lower spring 60, which at its lower end is permanently connected to the bottom wall 38 of the cup-shaped body 30 of the hydraulic stop member and at its upper end is free to come in contact with the sliding member 46, when the position of the latter is sufficiently close to the bottom of the shock-absorber. Alternatively, the lower spring 60 may also be fixed to the bottom of the sliding member 46 and come in contact with the bottom wall 38 of the cup-shaped body 30 of the hydraulic stop member when the position of the sliding member 46 is sufficiently close to the bottom of the shock-absorber.

The adjustment device described above operates as follows.

As shown in FIG. 1, when the static load acting on the suspension where the shock-absorber 10 is installed is small (i.e. in the unladen condition of the vehicle, in case of a shock-absorber used in a vehicle suspension), the main piston 16 will have an average position (static position) far from the compression end-of-stroke position. In this case, therefore, the sliding member 46 of the adjustment device will protrude axially downwards from the cylindrical body 34, pushed by the return spring 56 against suitable abutment elements (not shown) carried by the cylindrical body 34, and, at least in the static position of the main piston 16, the sliding member 46 will not come into contact with the lower spring 60 (even if, at least on a purely theoretical level, it might even come into contact with the lower spring without affecting the operation of the adjustment device). In this position, the intermediate cylindrical portion 46c of the sliding member 46 will be located at the first passage (or passages) 50 and will therefore allow oil to flow from the working chamber 44 of the cup-shaped body 30 to the compression chamber 20 not only through the axial channels on the inner surface of the side wall 36 of the cup-shaped body 30, but also through the axial channel 52 of the sliding member 46 and the first passage (or passages) 50 of the cylindrical body 34. This results in a low-level damping inside the hydraulic stop member.

By appropriately sizing the elastic elements (i.e. the return spring 56 and the lower spring 60, both of which must have a low stiffness, with the return spring 56 even less stiff than the lower spring 60) and the damping elements (the calibrated orifice 58, which must be very small in order to generate a high level of damping), it will be possible to significantly damp the relative movements between the sliding member 46 and the rod 14 of the shock-absorber, when the rod, due to the movements of the suspension, moves at a relatively high frequency (in practice, at frequencies higher than 0.3-0.5 Hz). This high level of damping of the relative movements between the sliding member 46 and the rod 14 of the shock-absorber will also be possible when the rod, during the compression movement, comes very close to the compression end-of-stroke position, thereby activating the hydraulic stop member, and therefore the sliding member 46 comes into contact with the lower spring 60, compressing it.

During motion of the rod 14 of the shock-absorber at relatively high frequencies, due to the movements of the suspension, the relative position between the sliding member 46 and the rod 14 will remain approximately the same as in the static condition (as shown in FIG. 1) when the rod is stationary; therefore, the first passages for oil (passage or passages 50 through the side wall 34a of the cylindrical body 34) will remain open, thereby continuing to ensure a low level of damping inside the hydraulic stop member. In practice, the sliding member 46 works like a low-pass filter, which changes its relative position with respect to the rod 14 only when the latter moves at a frequency lower than a certain threshold, and strongly attenuates relative movements when the rod 14 moves at frequencies higher than said threshold.

When, on the other hand, the static load on the suspension is high (e.g. in the condition of fully loaded vehicle, in case the shock-absorber is used in a vehicle suspension), the main piston 16 of the shock-absorber will have an average position (static position) closer to the compression end-of-stroke position, as shown in FIG. 2. Therefore, in the static position of the main piston 16 the sliding member 46 of the adjustment device will come in contact with the lower spring 60, compressing it, and will assume a relative position with respect to the cylindrical body 34 so as to close the first passage (or passages) 50 through the side wall 34a of the cylindrical body 34 and therefore cause an increase in the damping level inside the hydraulic stop member.

By appropriate sizing of the elastic elements and damping elements of the adjustment device, as illustrated above, the relative movements between the sliding member 46 and the rod 14 of the shock-absorber will be greatly attenuated when the rod moves at a relatively high frequency (in practice, at frequencies higher than 0.3-0.5 Hz). During motion of the rod 14 of the shock-absorber at high frequency, due to the suspension movements, the relative position between the sliding member 46 and the rod 14 will remain approximately the same as in the static condition when the rod is stationary, and thus the additional oil passages will remain closed, thereby continuing to ensure a high level of damping inside the hydraulic stop member.

Figure 3:
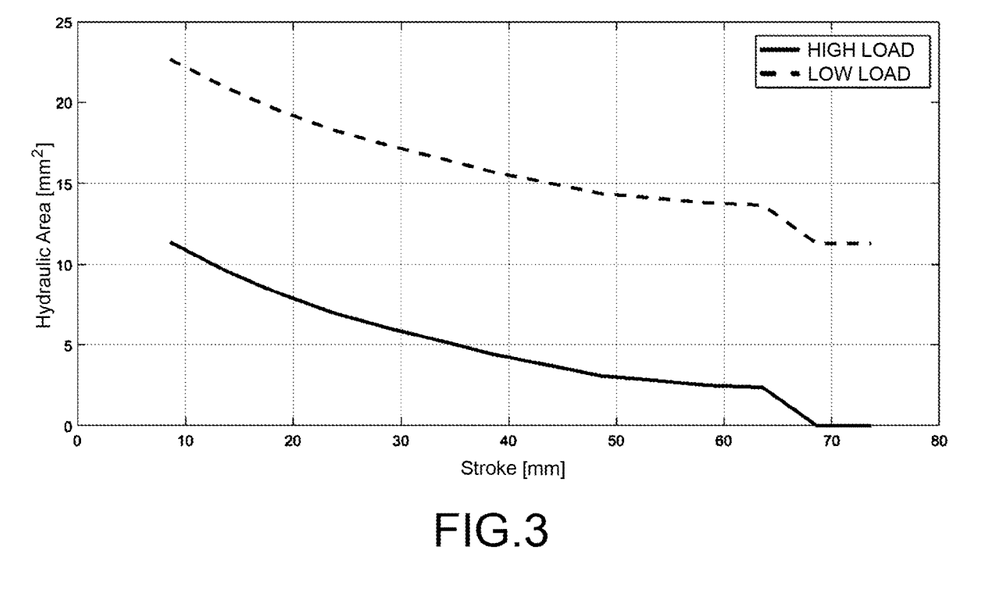
FIG. 3 shows the change in the flow area of the hydraulic restrictions of the hydraulic stop member of the shock-absorber of FIGS. 1 and 2 as a function of the compression stroke of the piston of the shock-absorber, both in the low load condition and in the high load condition of the shock-absorber.

FIG. 3 shows the trends of the flow area of the hydraulic stop member as a function of the compression stroke of the main piston of the shock-absorber in the two conditions of the vehicle, i.e. the unladen condition (dashed line) and the full load condition (continuous line), in a hydraulic shock-absorber according to the embodiment of FIGS. 1 and 2.

Figure 4:
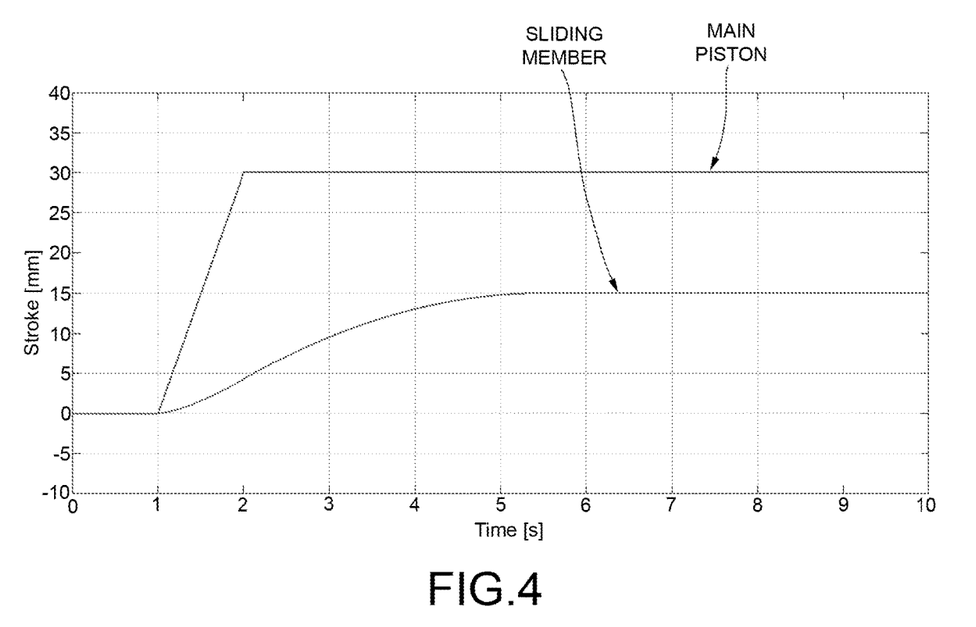
FIG. 4 shows the dynamic behavior of the shock-absorber of FIGS. 1 and 2 in the case wherein a step change is applied to the position of the piston of the shock-absorber in a given time, in particular a 30 mm change in one second.
Figure 5:
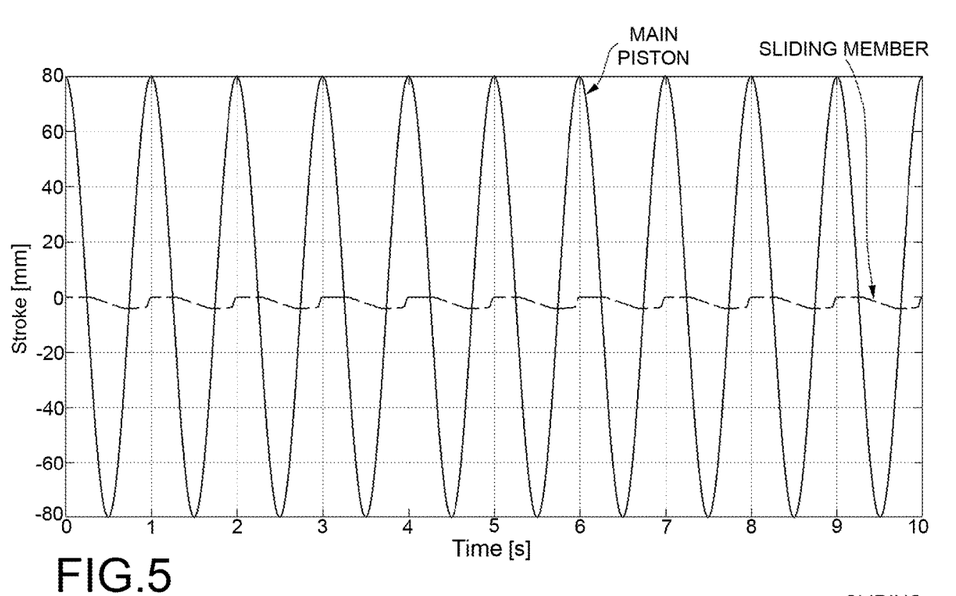
FIG. 5 shows the dynamic behavior of the shock-absorber of FIGS. 1 and 2 in the case wherein a sinusoidal change is applied to the position of the piston of the shock-absorber, in particular with an amplitude of 80 mm and a frequency of 1 Hz.
Figure 6:
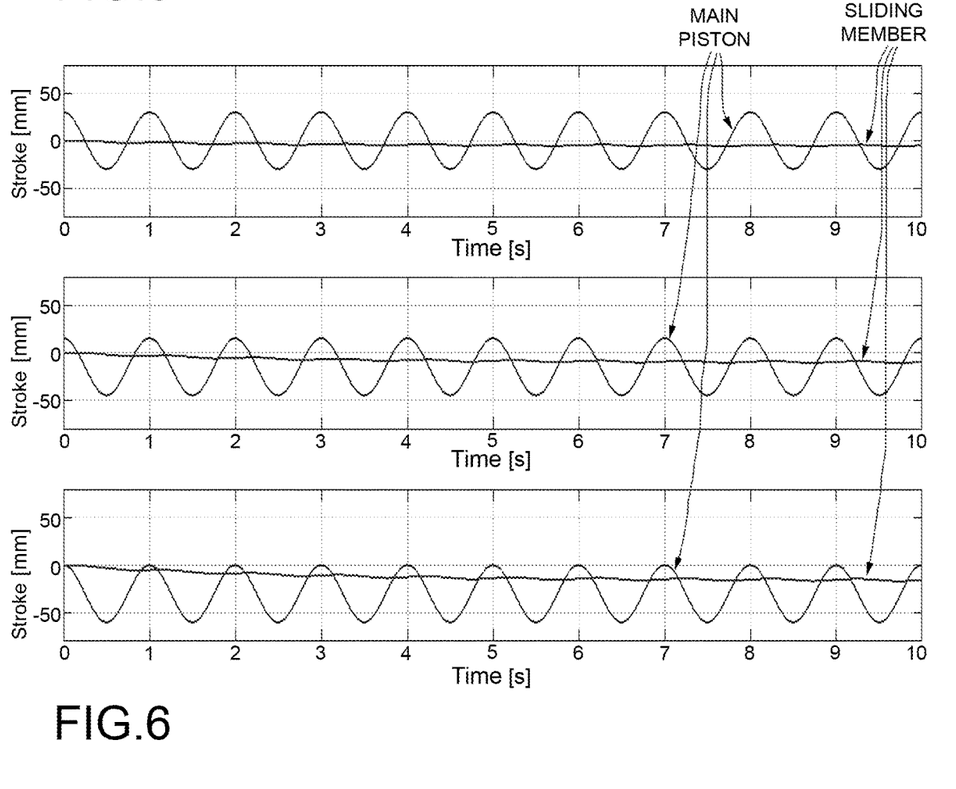
FIG. 6 shows the dynamic behavior of the shock-absorber of FIGS. 1 and 2 in three different conditions, in the case wherein a sinusoidal change is applied to the position of the piston of the shock-absorber, in particular with an amplitude of 30 mm and a frequency of 1 Hz, starting from three different static positions of the piston of the shock-absorber corresponding to three different static loads acting on the suspension.

FIGS. 4 to 6 show the dynamic behavior of the adjustment device, in terms of the position of the main piston 16 of the shock-absorber and the relative position between the sliding member 46 and the rod 14, in particular the behavior at low frequencies (i.e. at frequencies below 0.3-0.5 Hz) in FIG. 4, and the behavior at high frequencies (i.e. at frequencies above 0.3-0.5 Hz) in FIGS. 5 and 6.

By using a hydraulic shock-absorber according to the embodiment described above, a low damping level inside the hydraulic stop member is obtained when the vehicle is not heavily loaded, while the damping level increases when the vehicle is fully loaded.

Figure 7:
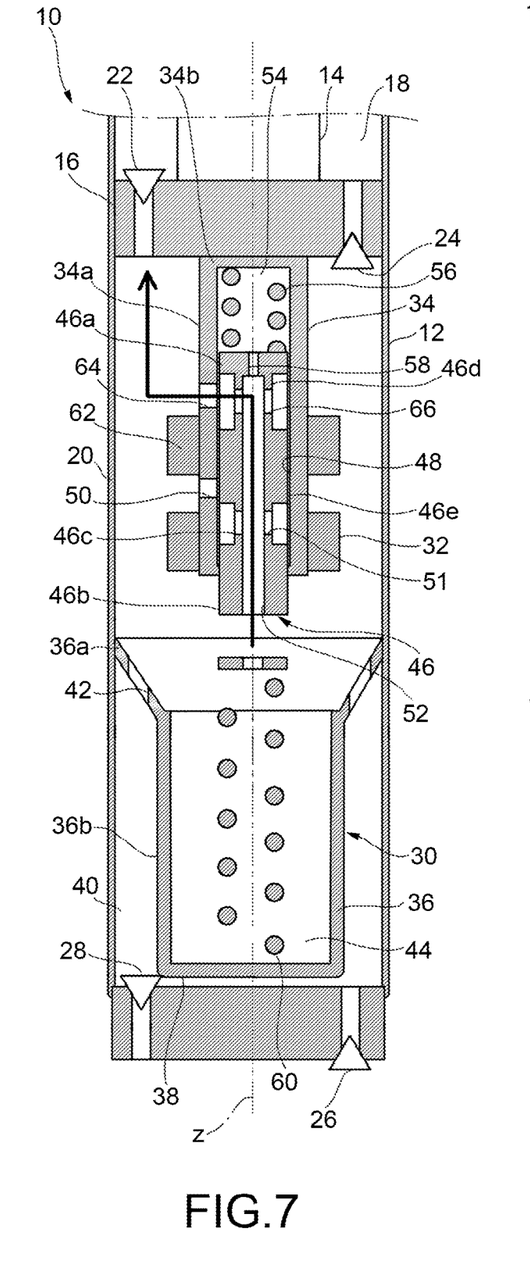
FIG. 7 is a schematic sectional view of a portion of a twin-tube hydraulic shock-absorber for a vehicle according to a second embodiment of the present invention, in a condition of low static load acting on the suspension (unladen vehicle)
Figure 8:
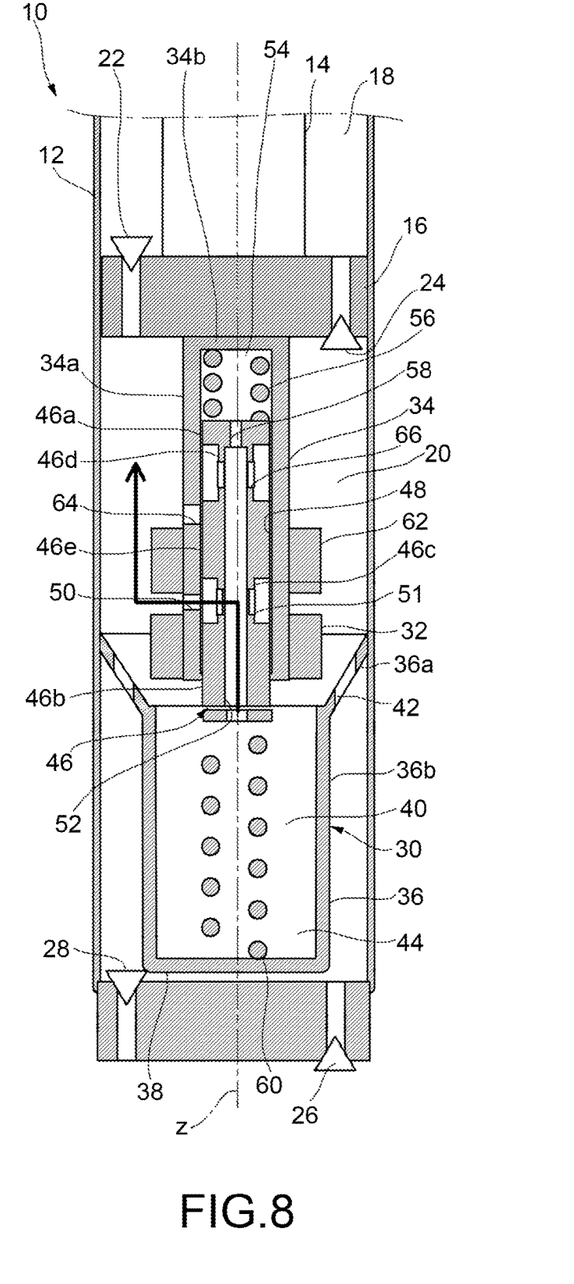
FIG. 8 is a schematic sectional view of a portion of a twin-tube hydraulic shock-absorber for a vehicle according to a second embodiment of the present invention, in a condition of high static load acting on the suspension (fully loaded vehicle)

A further embodiment of a hydraulic shock-absorber according to the present invention is illustrated in FIGS. 7 and 8, where the same reference numbers have been assigned to parts and elements identical or corresponding to those of FIGS. 1 and 2.

This further embodiment provides a different configuration of the adjustment device, designed to avoid a possible disadvantage of the embodiment described above, namely that in the vehicle fully loaded the average position of the main piston of the shock-absorber is closer to the mouth of the hydraulic stop member, with the result that the hydraulic stop member starts to work earlier than in the low-load condition of the vehicle.

According to the embodiment of FIGS. 7 and 8, the hydraulic stop member comprises a second auxiliary piston 62 configured to sealingly slide along the side wall 36 of the cup-shaped body 30. The second auxiliary piston 62 is mounted on the cylindrical body 34 above the auxiliary piston 32 (hereinafter referred to as first auxiliary piston), at a suitable distance therefrom, so that the first passage (or passages) 50 is (are) located between the first auxiliary piston 32 and the second auxiliary piston 62. Preferably, the second auxiliary piston 62 is identical to the first auxiliary piston 32.

The side wall 34a of the cylindrical body 34 further comprises, above the second auxiliary piston 62, one or more second passages 64, in addition to the first passage (or passages) 50 between the two auxiliary pistons 32 and 62.

In order to allow adjustment of the oil flow also through the passage (or passages) 64 by closing or opening these passages depending on the axial position along the cavity 48 of the cylindrical body 34, the sliding member 46 comprises a second intermediate cylindrical portion 46d having a diameter smaller than the inner diameter of the cavity 48, axially interposed between the upper cylindrical portion 46a and the intermediate cylindrical portion (hereinafter referred to as the first intermediate cylindrical portion) 46c. The second intermediate cylindrical portion 46d has one or more radial passages 66 for allowing oil to flow between the working chamber 44 and the compression chamber 20 through the axial channel 52 and the passage (or passages) 64 when the second intermediate cylindrical portion 46*d*, with the radial passage (or radial passages) 66, is located at the passage (or passages) 64 of the cylindrical body 34 (as shown in FIG. 7). The first and second intermediate cylindrical portions 46*c* and 46*d* are separated from each other by a third intermediate cylindrical portion 46*e* configured to sealingly slide along the axial cavity 48 of the cylindrical body 34.

Apart from that, the description provided above with reference to the embodiment of FIGS. 1 and 2 still applies.

By appropriately sizing the distances between the two auxiliary pistons 32 and 62 and between the first and second passages 50 and 64 through the side wall 34*a* of the cylindrical body 34, the following behavior may be achieved.

In the condition of low static load on the suspension, as shown in FIG. 7, only the second passages 64 (upper passages) of the cylindrical body 34 are in communication with the axial channel 52 through the radial passage (or radial passages) 66, while the first passages 50 (lower passages) of the cylindrical body 34 are closed. The operation of the adjustment device is therefore identical to the one illustrated above in connection with the embodiment of FIGS. 1 and 2.

When, on the other hand, a high static load acts on the suspension, as shown in FIG. 8, in the static position of the main piston 16 the sliding member 46 comes in contact with the lower spring 60, compressing it, and therefore moves axially with respect to the cylindrical body 34, penetrating more therein against the action of the return spring 56, thereby closing the (upper) passages 64 and opening the (lower) passages 50. During the compression movement of the rod 14, starting from the static position, the (lower) passages 50 of the cylindrical body 34 will remain open with respect to the compression chamber 20 until not only the first auxiliary piston 32, but also the second auxiliary piston 62, have entered the cup-shaped body 30 of the hydraulic stop member, thus achieving a low damping level within the hydraulic stop member.

As soon as the second auxiliary piston 62 has also entered the cup-shaped body 30 of the hydraulic stop member, the (lower) passages 50 will also be closed with respect to the compression chamber 20. Therefore, starting from this condition, both the (lower) passages 50 and the (upper) passages 64 of the cylindrical body 34 will be closed, with a resulting increase in the damping level produced by the hydraulic stop member.

In the full-load condition the damping level produced is thus higher than in the low-load condition, but this high level of damping occurs for positions of the main piston closer to the compression end-of-stroke position. In practice, the intervention of the hydraulic stop member during the compression stroke is delayed.

Figure 9:
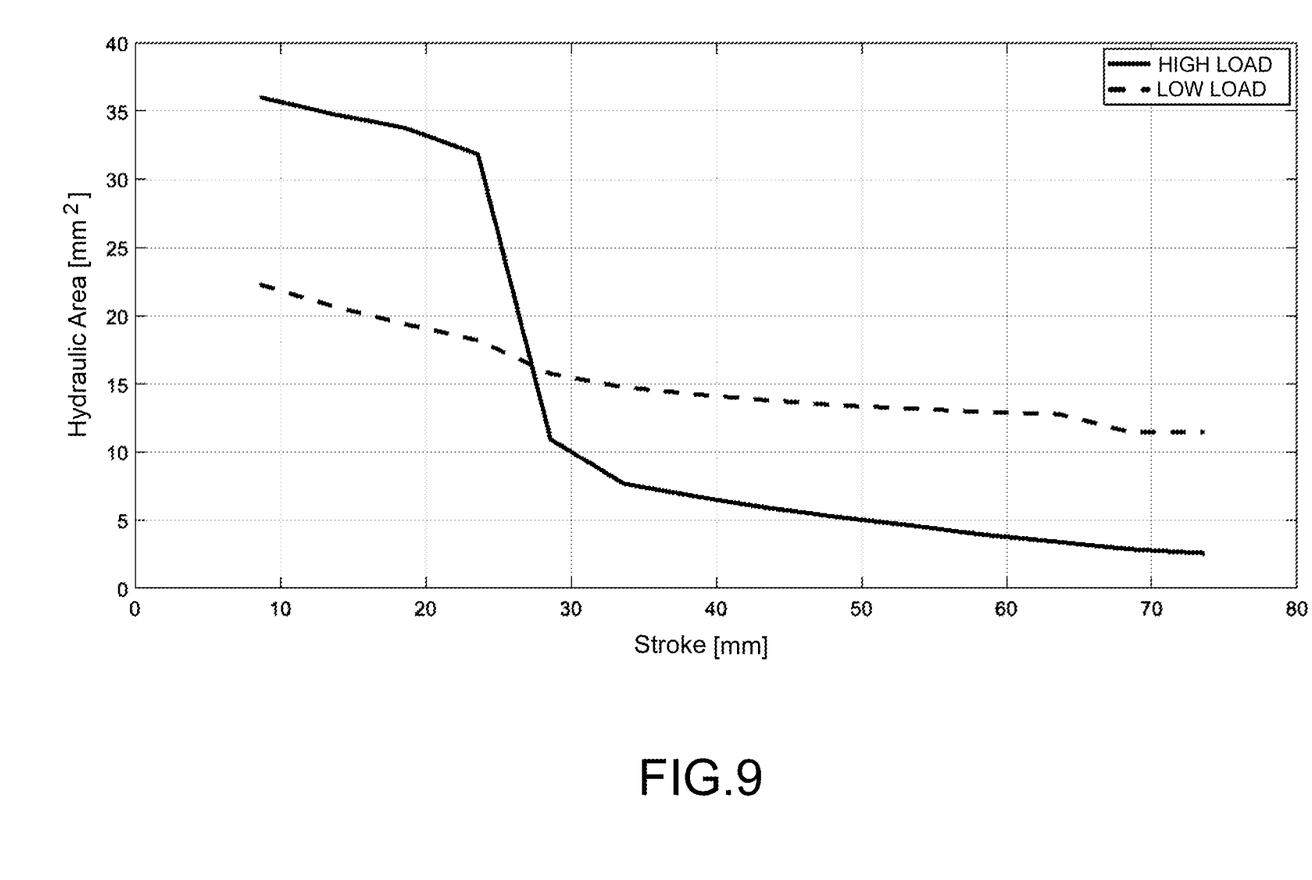
FIG. 9 shows the change in the flow area of the hydraulic restrictions of the hydraulic stop member of the shock-absorber of FIGS. 7 and 8 as a function of the compression stroke of the piston of the shock-absorber, both in the low static load condition and in the high static load condition of the suspension.

This behavior is well illustrated in FIG. 9, which refers to the particular case wherein the area of the (lower) passages 50 is larger than the area of the (upper) passages 64. This figure shows the trend of the flow cross-sectional area of the hydraulic restrictions of the hydraulic stop member as a function of the compression stroke of the main piston, in the low-load (dashed line) and full-load (continuous line) conditions, in a shock-absorber according to the embodiment of FIGS. 7 and 8.

The principle of the invention remaining unchanged, embodiments and constructional details may be modified with respect to those described and illustrated purely by way of non-limiting example, without thereby departing from the scope of protection as described and claimed herein.

The invention claimed is:

1. A hydraulic shock-absorber, particularly for a vehicle suspension, comprising
    an outer cylindrical tube and an inner cylindrical tube extending coaxially to each other along a longitudinal axis (z) of the hydraulic shock-absorber,
    a rod arranged coaxially to said outer and inner cylindrical tubes and projecting partially from upper ends thereof,
    a main piston slidably mounted in the inner cylindrical tube for sliding along said longitudinal axis (z) and fixed to the rod, the main piston separating an internal volume of the inner cylindrical tube into a rebound chamber and a compression chamber, both containing an incompressible damping fluid, and
    a hydraulic stop member received in the compression chamber so as to operate during an end section of a compression stroke of the hydraulic shock-absorber to cause an increase in hydraulic damping force applied to an assembly formed by the rod and the main piston,
    wherein the hydraulic stop member comprises a cup-shaped body coaxially mounted in the inner cylindrical tube inside the compression chamber, and a first auxiliary piston which is mounted on a cylindrical body rigidly connected to the main piston and extending on an opposite side of the rod with respect to the main piston, the first auxiliary piston being configured to sealingly slide in the cup-shaped body during said end section of the compression stroke of the hydraulic shock-absorber, encompassing with the cup-shaped body a working chamber where the incompressible damping fluid is compressed by said first auxiliary piston as the first auxiliary piston slides in the cup-shaped body towards a bottom wall thereof of the cup-shaped body,
    wherein the cylindrical body is a hollow body and has, above said first auxiliary piston, at least one first passage extending through a side wall of the cylindrical body for putting the working chamber of the hydraulic stop member in fluid communication with the compression chamber of the hydraulic shock-absorber,
    wherein the hydraulic shock-absorber further comprises a sliding member slidably received inside the cylindrical body for opening or closing said at least one first passage of the cylindrical body, and elastic means configured to cooperate with the sliding member so as to move the sliding member, depending on static load acting on the vehicle suspension where the hydraulic shock-absorber is installed, and depending on an average position of the main piston, between a first position, or low-load position, where the sliding member leaves said at least one first passage open, allowing the incompressible damping fluid to flow from the working chamber of the hydraulic stop member to the compression chamber of the hydraulic shock-absorber, and a second position, or high-load position, where the sliding member closes said at least one first passage, and
    wherein said elastic means comprise an upper spring, which is received inside the cylindrical body and acts on the sliding member to urge the sliding member downwards, and a lower spring, which is interposed between a bottom end of the sliding member and the bottom wall of the cup-shaped body and acts on the sliding member to cause an upward movement of the sliding member relative to the cylindrical body when the position of the main piston is closer than a given distance to a compression end-of-stroke position of the hydraulic shock-absorber, the position of the main piston closer than a given distance to the compression end-of-stroke position of the hydraulic shock-absorber corresponding to a full-load condition of the vehicle suspension where the hydraulic shock-absorber is installed.

2. The hydraulic shock-absorber as set forth in claim 1, wherein said lower spring is attached at its bottom end to the bottom wall of the cup-shaped body.

3. The hydraulic shock-absorber as set forth in claim 1, wherein the sliding member comprises an axial channel extending up to the bottom end of the sliding member, wherein the sliding member comprises a first intermediate cylindrical portion, a diameter of said first intermediate cylindrical portion being smaller than an inner diameter of the cylindrical body, and wherein said first intermediate cylindrical portion has at least one first radial passage in fluid communication with the axial channel, whereby when the sliding member is positioned in the cylindrical body with said first intermediate cylindrical portion facing said at least one first passage of the cylindrical body, the incompressible damping fluid is allowed to flow from the working chamber of the hydraulic stop member to the compression chamber of the hydraulic shock-absorber through the axial channel of the sliding member and through said at least one first passage of the cylindrical body.

4. The hydraulic shock-absorber as set forth in claim 3, wherein the sliding member further comprises a calibrated orifice that extends through an upper cylindrical portion of the sliding member and puts the axial channel in fluid communication with an upper pressure chamber of the cylindrical body placed above the sliding member, said calibrated orifice having a diameter smaller than the diameter of the axial channel so as to generate a high damping level for the incompressible damping fluid flowing between the working chamber and said upper pressure chamber.

5. The hydraulic shock-absorber as set forth in claim 1, wherein the sliding member comprises an axial channel extending up to the bottom end of the sliding member, wherein the sliding member comprises a first intermediate cylindrical portion, a diameter of said first intermediate cylindrical portion being smaller than an inner diameter of the cylindrical body, and wherein said first intermediate cylindrical portion has at least one first radial passage in fluid communication with the axial channel, whereby when the sliding member is positioned in the cylindrical body with said first intermediate cylindrical portion facing said at least one first passage of the cylindrical body, the incompressible damping fluid is allowed to flow from the working chamber of the hydraulic stop member to the compression chamber of the hydraulic shock-absorber through the axial channel of the sliding member and through said at least one first passage of the cylindrical body, wherein the sliding member further comprises a calibrated orifice that extends through an upper cylindrical portion of the sliding member and puts the axial channel in fluid communication with an upper pressure chamber of the cylindrical body placed above the sliding member, said calibrated orifice having a diameter smaller than the diameter of the axial channel so as to generate a high damping level for the incompressible damping fluid flowing between the working chamber and said upper pressure chamber, and wherein said upper spring is received in said upper pressure chamber of the cylindrical body.

6. The hydraulic shock-absorber as set forth in claim 1, wherein the hydraulic stop member further comprises a second auxiliary piston configured to sealingly slide in the cup-shaped body and mounted on the cylindrical body above said first auxiliary piston, wherein said at least one first passage of the cylindrical body is arranged between said first and second auxiliary pistons, wherein the cylindrical body further comprises at least one second passage extending through the side wall of the cylindrical body, above said second auxiliary piston, to put the working chamber of the hydraulic stop member in fluid communication with the compression chamber of the hydraulic shock-absorber, and wherein the sliding member is configured to open or close, depending on its position along the cylindrical body, also said at least one second passage of the cylindrical body.

7. The hydraulic shock-absorber as set forth in claim 6, wherein the sliding member is configured to take a first position, where it closes said at least one first passage of the cylindrical body and opens said at least one second passage of the cylindrical body, and a second position, where it closes said at least one second passage of the cylindrical body and opens said at least one first passage of the cylindrical body.

8. A vehicle suspension comprising a hydraulic shock-absorber as set forth in claim 1.

* * * * *